Sept. 25, 1962 G. W. HERNAN 3,056,119

RECORDING CIRCUIT

Filed March 10, 1961 2 Sheets-Sheet 1

INVENTOR.
GEORGE W. HERNAN
BY
Morton C. Jacobs
ATTORNEY

INVENTOR.
GEORGE W. HERNAN
BY Morton C. Jacobs
ATTORNEY

United States Patent Office 3,056,119

Patented Sept. 25, 1962

3,056,119

RECORDING CIRCUIT

George W. Hernan, Haddonfield, N.J., assignor to Ultronic Systems Corp., a corporation of Delaware Filed Mar. 10, 1961, Ser. No. 94,724

10 Claims. (Cl. 340—174.1)

This invention relates to recording circuits and particularly to such circuits for energizing a magnetic recording head.

A magnetic recording circuit or amplifier for pulse or digital signals is sometimes called a "write" amplifier or driver circuit. This circuit is used to supply an energizing pulse through the winding linked to a magnetic recording head. The resulting magnetic flux in the head, in turn, changes the remanent flux in a storage medium such as a magnetic drum or magnetic tape. This circuit may take the form of a pulse shaping circuit, a driver amplifier, and a network to couple the driver output to the head winding. Among the problems associated with the design of such circuits is that of selecting suitable circuit values to avoid deterioration of the pulse shape supplied by the pulse shaping circuit, and that of using the recording winding as a playback or "read" winding also and connecting a "read" amplifier to it. The circuit of this invention is arranged to avoid such problems.

Accordingly, it is an object of this invention to provide a new and improved recording circuit.

Another object is to provide a new and improved recording circuit for pulse and digital recording on a magnetic medium.

Another object is to provide a new and improved recording circuit for magnetic drum recording which is reliable in operation and economical in construction.

In accordance with this invention a magnetic recording circuit includes an energizing circuit coupled to the winding of a magnetic recording head. The capacitance of the coupling and the inductance of the winding form an oscillating circuit, the period of a half cycle of which is substantially equal to the width of the pulse to be recorded. A damping circuit connected to the oscillating circuit terminates the oscillation substantially upon completion of the first half cycle. Thereby, the waveshape of the recording current is a half cycle sine wave and is suitable for magnetic recording.

The foregoing and other objects of this invention, the various features thereof as well as the invention itself may be more fully appreciated from the following description when read together with the accompanying drawing in which.

In the drawing, corresponding parts are referenced by similar numerals.

Figure 1:
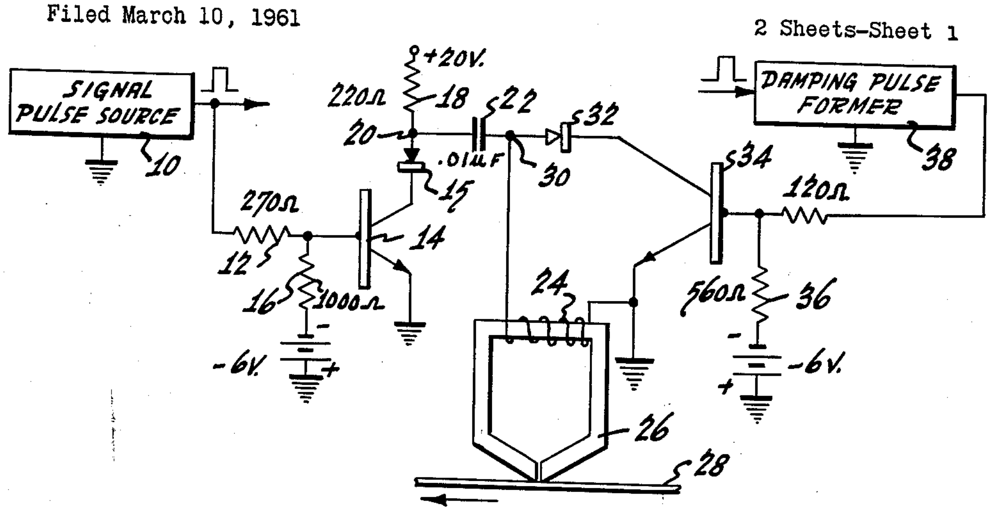
FIG. 1 is a schematic circuit diagram of a recording circuit embodying this invention.

In FIG. 1, the recording circuit includes a signal pulse source 10 which is connected via a resistor 12 to the base of a transistor 14. A biasing resistor 16 at the base of the transistor is returned to a negative bias source. The transistor 14 is of the NPN type, the emitter of which is returned to ground. The collector of the transistor is connected via a diode 15 which is poled to pass collector-emitter current in the forward direction. The anode of the diode 16 is connected through a load resistor 18 to a positive operating potential source.

The junction 20 is connected via a coupling circuit including a capacitor 22 to a winding 24 which is part of a magnetic recording head 26 arranged for recording on a magnetic medium 28. This invention is not restricted to the use of any particular kind of head 26 or medium 28, and the latter may include known forms of magnetic drums and magnetic tapes.

The junction 30 between the capacitor 22 and winding 24 is connected through a diode 32 to the collector of a second transistor 34. The emitter of the transistor 34 is connected to the other terminal of the recording winding 24, which is returned to ground. The base of the transistor is negatively biased via biasing resistor 36, and it receives positive going pulses from a source 38 identified as a damping pulse former.

The signal pulse source 10 may be any suitable type of pulse source, either synchronous or asynchronous. For example, the source 10 may be a bistable flip-flop. The pulse former 28 is operated synchronously with the source 10, and may include a one-shot multivibrator. The pulse former 38 may be considered as supplying a normally high output voltage so that the transistor 34 is normally conductive. The pulse former 38 is energized by pulses from the signal source 10 so that the one-shot is switched to its opposite condition to supply a negative going signal to the base of transistor 34 and render it non-conductive during the signal pulse from the source 10.

Figure 2:
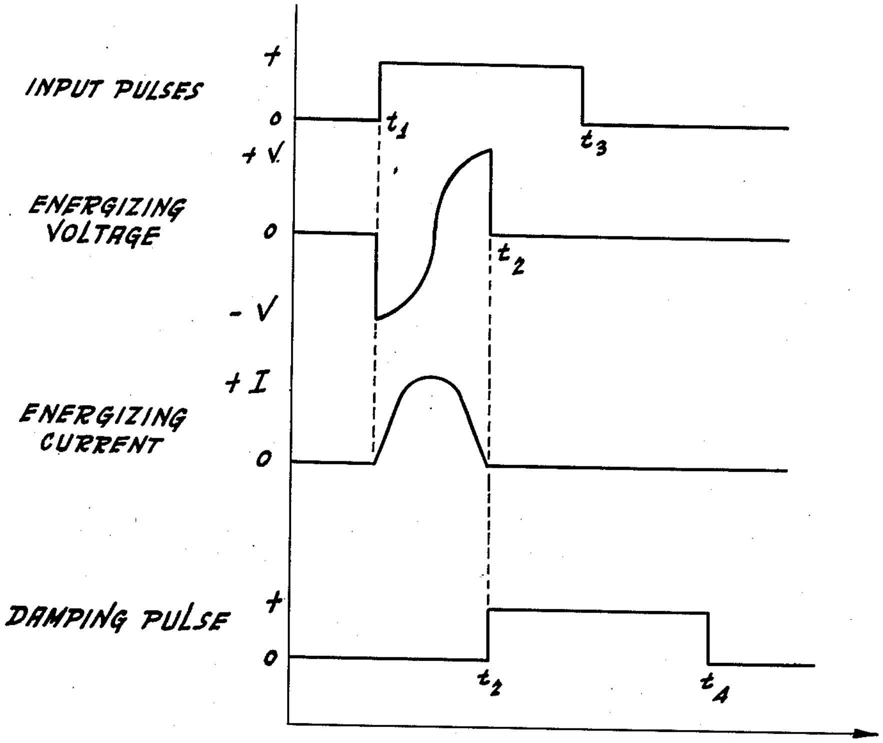
FIG. 2 is an idealized graphical diagram of waveforms appearing at various parts of the circuit of FIG. 1.

In operation, a positive going input pulse from the source 10 (see FIG. 2) renders the first transistor 14 conductive. The negative going pulse appearing at the terminal 20 is passed by the capacitor 22 to drive the recording winding 24. The network made up of the capacitor 22 and recording winding 24 form a ringing circuit, and the voltage and current waveforms appearing at the junction 30 are shown in FIG. 2. That is, the voltage waveform is a cosine wave, and the current waveform is a sine wave formed by the oscillation in the LC network.

The time constant of the pulse former 38, that is, the one-shot multivibrator time constant of that circuit 38, is made to be substantially equal to the period of a half cycle of the oscillation in the LC network. Thus, upon completion of the first half cycle of the current sine wave in the recording winding 24, the output of the pulse former 38 goes positive again to render the transistor 34 conductive. The conducting transistor 34 holds the junction 30 substantially at ground potential and damps any further oscillations in the LC network. Thus, the pulse driving the recording winding 24 is a sine wave current pulse and is suitable for recording purposes. The recording pulse is formed by the recording winding and coupling capacitor and is suitable for its intended purpose. In addition to coupling the energizing circuit to the recording winding, the capacitor 22 serves to shape the energizing pulse. The inductance of winding 24, rather than being an undesirable part of the circuit, is actually utilized in the pulse shaping process.

Any time after transistor 34 is switched on, for example, at time *t*–3 (FIG. 2), the pulse from source 10 may be terminated to render the transistor 14 non-conductive. The capacitor 22 is then allowed to recharge to the operating potential of transistor 14 via the series path of resistor 18 and the conductive second transistor 34. After the capacitor 22 is recharged, say at time *t*–4 in FIG. 2, the circuit is ready to recycle by means of a new input pulse source 10 and the termination of the damping pulse from pulse former 38.

The resistor 18 is chosen so that the recharging time of the capacitor 22 is appropriate for a desired repetition rate. The diode 32 in the damping circuit prevents a large negative voltage from being applied across the collector-emitter path of transistor 34 in the reverse direction when the voltage at the junction 30 swings to a low negative potential upon the application of the input pulse from source 10. Similarly, the diode 15 prevents the application of a large negative swing of voltage at terminal 20 across the collector-emitter path of the first transistor 14, which negative swing occurs upon the switching on of the second transistor 34 to clamp the voltage at junction 30 close to ground potential.

As indicated, the recording current pulse is a half sine wave whose maximum amplitude is I and whose time duration is T. The values of the coupling capacitor 22 and the operating potential are chosen to give desired values for these pulse parameters. The equations for calculating the capacitance of capacitor 22 and the operating potential V, when the inductance L of the winding 24 and the desired maximum current I and pulse width T are known are as follows:

$$V=2LIT$$

$$C=\frac{1}{4LT^2}$$

Figures 3, 4, 5:
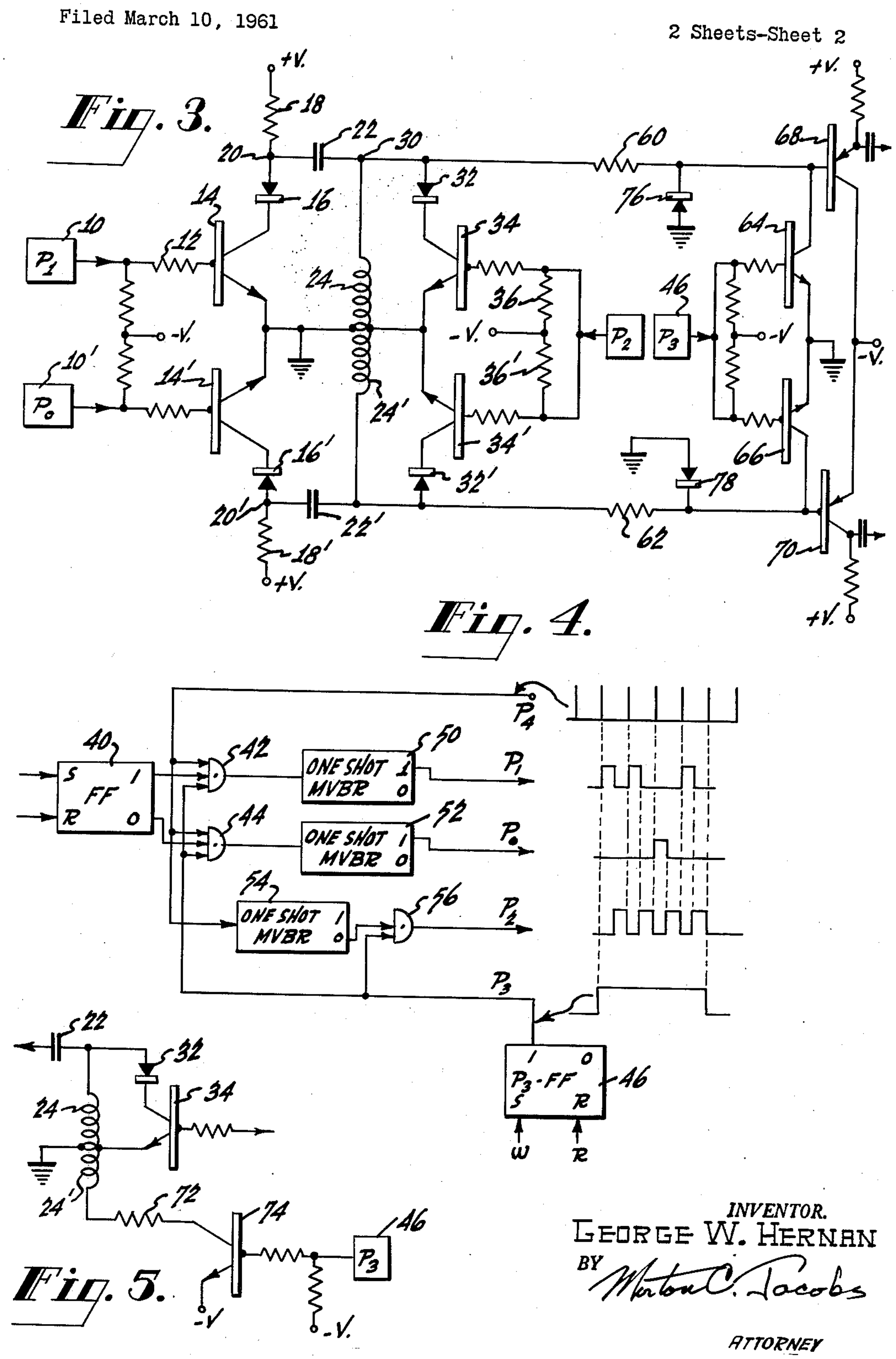
FIG. 3 is a schematic circuit diagram of another embodiment of this invention in which the recording circuit is suitable for recording in opposite directions in accordance with the two forms of binary input signals.
FIG. 4 is a schematic block diagram illustrating the generation of signals suitable for operating the circuit of FIG. 3.
FIG. 5 is a schematic circuit diagram of a modification of the circuit of FIG. 3.

In FIG. 3 the recording circuit of this invention is shown adapted for use with a playback or reading circuit in addition to the writing or recording circuit. That is, the recording winding 24 is also used for reading the recorded impulses on the magnetic medium.

In the circuit of FIG. 3, the recording circuit of FIG. 1 is shown with parts corresponding to those previously described referenced by the same numerals. A second recording circuit, generally the same as the first circuit, is shown in which parts corresponding to those of the first circuit are referenced by the same numerals with the addition of a prime (′). The operation of the recording circuit that includes the transistor switch 14′, the ringing circuit made up of capacitor 22 and recording winding 24′, and the damping switch 34 is generally the same as the circuit described above. However, the magnetization produced by the energizing current in winding 24′ is opposite to the magnetization due to winding 24. That is, the windings 24 and 24′ may be formed as a single winding with a grounded center tap or these windings 24 and 24′ may be separately wound to be effective for oppositely directed magnetizations. Thus, the magnetization produced by recording winding 24 may be used to represent the binary digit 1 and the magnetization produced by recording winding 24′ may be used to represent the binary digit 0. Pulses supplied by the source 10 represent binary numeral 1, and pulses supplied by the source 10′ represent binary numeral 0. At any instant, a pulse is supplied either by source 10 or source 10′, but not both.

Accordingly, the sources 10 and 10′ may be ultimately supplied from a single flip-flop as shown in FIG. 4 where the flip-flop 40 represents the well-known bistable multivibrator, having set (S) and reset (R) inputs and corresponding outputs representing the binary digits 1 and 0, respectively. When the flip-flop is set by a pulse at the S-input, the 1-output may be considered to be at a relatively positive voltage and the 0-output relatively negative. When reset by a pulse at the R-input, the outputs are reversed.

The 1-output of flip-flop 40 is supplied to a gate 42, and the 0-output is supplied to a gate 44. Both gates also receive timing pulses P–4, which timing pulses may be derived in any suitable fashion such as from the well-known timing track of the magnetic drum 28. A third input signal to the gates 42 and 44 originates from the 1-output of flip-flop 46, the voltage of which is relatively positive when the flip-flop 46 is set and representing the operating condition of writing on the magnetic medium 28, and relatively negative when reset, such as during the reading operation. The output signals of the gates 42 and 44 (which may be of any well-known type) are positive pulses when all of the inputs are positive-going. These gates are respectively connected to one-shot multivibrators 50 and 52 which also have 1- and 0-outputs similar to those of flip-flop 40. The 1-outputs of these multivibrators 50 and 52 are the waveforms P–1 and P–0, respectively, and correspond to the outputs of the sources 10 and 10′ in FIG. 3. The timing pulses P–4 are also supplied to a one-shot multivibrator 54, the output pulses of which are derived from the 0-output side thereof, so that the outputs of the multivibrator 54 are in the opposite direction from the outputs of multivibrators 50 and 52. The output pulses of the multivibrator 54 are gated in gate 56 by the P–3 waveform during the writing operation to provide the P–2 pulses used in the circuit of FIG. 3. The P–2 pulses are positive-going, in effect, upon termination of the P–1 and P–0 pulses.

The waveforms of FIG. 4 illustrate the writing of the series of binary signals representing the digits 1 1 0 1, reading from left to right. The P–1 or P–0 (recording) pulses occur during the first half of each cycle, and the P–2 (damping) pulses occur during the second half of each cycle. Thus, the writing is via winding 24 or winding 24′.

The windings 24 and 24′ are both used for reading from the magnetic medium 28. The pulses induced in the windings 24 and 24′ are utilized by connecting the junction terminals 30 and 30′ through resistors 60 and 62, respectively, to the collectors of two transistors 64 and 66, the emitters of which are connected to ground. The bases of the transistors 64 and 66 are connected through resistor circuits to the output of P–3 flip-flop 46. The junctions 30 and 30′ are also connected via the resistors 60 and 62 to the bases of amplifier transistors 68 and 70, respectively, which are connected in the emitter-follower mode. These transistors 68 and 70 have their collectors connected to a negative operating potential, and their emitters are capacitor coupled to subsequent stages of the amplifier. Clamping diodes 76 and 78 are connected to the bases of transistors 68 and 70 to prevent a voltage swing below ground.

In operation, when a writing operation is to be performed, the P–3 waveform is a relatively high voltage to bias on the transistors 64 and 66 during the write operation. Thus, these transistors 64 and 66 are conducting, and effectively the collectors of those transistors are clamped to ground. Therefore, when write pulses are applied to the recording windings 24 and 24′, the voltages that appear at the bases of the read amplifiers 68 and 70 are effectively held at ground potential by means of these transistors 64 and 66 and diodes 76 and 78. The resistors 60 and 62 are large to provide isolation of the read amplifiers from the relatively large recording voltages, which voltages may assume amplitudes of 20 volts.

During the read operation, the P–3 waveform is negative, and the transistors 64 and 66 are cut off. During this time, no P–0 or P–1 pulses are supplied. The playback pulses induced in the windings 24 and 24′ are in opposite directions at the terminals 30 and 30′ and are effectively supplied to the bases of the read amplifier transistors 68 and 70. The read amplifier operates properly without effect of the recording circuit since the transistors 14, 14', 34, and 34' are all cut off. The induced voltages during the read operation are of the order of magnitude of 50 millivolts; these voltages are supplied to the read amplifier without substantial attenuation.

Accordingly, the recording circuit of this invention is effective for single direction pulse recording as well as pulse recording in opposite directions. It is compatible with a read amplifier connection to the recording windings so that read and write operations may be performed with the same recording head winding.

This invention is appropriate for use with various systems of magnetic recording. For example, the system of FIG. 3 is known as return-to-zero recording. In FIG. 5 the circuit for recording makes use of the system known as return-to-bias. In the circuit of FIG. 5 the recording circuit is similar to that described above in connection with FIG. 1, and corresponding parts are referenced by the same numerals. For recording binary number 0, the recording winding 24' is used. This winding 24' is connected through a resistor 72 to the collector of a transistor 74, the emitter of which is returned to a negative operating potential. The write waveform P–3 is supplied to the base of transistor 74, so that transistor 74 is operating throughout the write operation.

In operation, the current in winding 24', the bias current, produces a bias magnetization in the 0 direction throughout the write operation due to transistor 74 being conductive. The magnetization produced by the current in winding 24' is half that produced by the winding 24 and in the opposite direction. Thus, when energizing pulses are supplied to the winding 24, the magnetization is twice the opposing bias magnetization so that effectively there is a net unit magnetization opposite to the bias direction. During the read operation, the transistor 74 is cut off, and the read operation may be performed in the same manner as described above in connection with FIG. 3.

The parameters set forth in FIG. 1 of the drawing for the purpose of illustrating one embodiment of this invention are not to be construed as a limitation on the scope thereof. With these parameters, a repetition rate of 90 kilocycles per second is determined by the recharging resistor 18, the pulse duration is 3.5 microseconds, and the recording current is about 150 milliamps; the inductance of the recording winding 24 is about 140 microhenries. These parameters would vary with the operational and recording head requirements, as explained above. Transistors of the NPN type suitable for these parameters are 2N585. PNP transistors may also be used with appropriate modification of the biases and signals.

This invention may be used with various other recording systems such as phase modulation recording. The operation of the damping switch transistor 34 may be synchronized with or otherwise derived from the input pulses. For example, this transistor may be operated by a threshold detector such as a Schmitt trigger circuit being triggered by the peak positive amplitude of the cosine voltage waveform, which trigger circuit would supply a pulse to operate the multivibrator 54 to switch on the transistor 34. In other respects, the operation would be the same as described above.

Thus, it is seen from the above description that a new and improved pulse recording circuit is provided. In this circuit, the capacitance of the coupling circuit and the inductance of the recording winding are used to form the pulse shape to be recorded. The recording pulse is a half sine wave which approximates the optimum rise time that can be used. This circuit is also adapted to be used with a read-write recording circuit, that is, one in which the recording head winding is also used for playback.

What is claimed is:

1. In a magnetic recording system including a magnetic recording head with a winding to be energized with signal current, a recording circuit for energizing said winding, said circuit comprising a first amplifier switch, means including a capacitor for coupling said switch in energizing relation to said winding and for forming an oscillator circuit with said winding, a second amplifier switch connected in damping relation to said oscillator circuit, and means for supplying pulses in a certain time relation to said amplifier switches to render them conductive one after the other to control the energization waveshape for said winding, said pulse supplying means being effective to render said second switch conductive after said first switch by a time period substantially equal to that of the first half cycle of oscillation in said oscillator circuit.

2. In a magnetic recording system, a recording circuit as recited in claim 1 wherein said pulse supplying means is effective to render said first switch non-conductive when said second switch is rendered conductive.

3. In a magnetic recording system including a magnetic recording head with a winding to be energized with signal current, a recording circuit for energizing said winding, said circuit comprising a first amplifier switch, means including a capacitor for coupling said switch in energizing relation to said winding and for forming an oscillator circuit with said winding, a second amplifier switch connected in damping relation to said oscillator circuit, and means for supplying pulses in a certain time relation to said amplifier switches to render them conductive one after the other to control the energization waveshape for said winding, each of said switches including unidirectional circuit means for absorbing large reverse signal changes produced upon operation of the other of said switches.

4. A magnetic recording system comprising a magnetic recording head having a winding, and a recording circuit for said winding, said circuit comprising first and second switches, means including a capacitor for coupling said first switch to said winding in energizing relation, said second switch being connected to said capacitor and said winding to damp oscillations therein, and means for operating said first and second switches in succession with the operation of said second switch occurring after that of said first switch by a certain period substantially equal to that of the first half cycle of oscillation in said capacitor and winding.

5. A magnetic recording system comprising a magnetic recording medium, a magnetic recording head for recording on said medium and having a winding, an energizing circuit for said winding including a first transistor circuit, and a capacitor coupling said transistor circuit to said winding and forming an oscillator circuit therewith, a damping circuit including a second transistor circuit connected across said winding, and means for applying pulses to said transistors successively to control their conductive states and the energization waveshape for said winding, said transistor circuits being connected in the common emitter mode.

6. A magnetic recording system as recited in claim 5 wherein said first transistor circuit includes a transistor and a collector load resistor, and said capacitor is connected to a terminal between said resistor and the collector of said transistor.

7. A magnetic recording system as recited in claim 6 wherein said first transistor circuit includes a diode connected to said transistor collector and poled to block reverse currents in said transistor.

8. A magnetic recording system as recited in claim 7 wherein said second transistor circuit includes a transistor and a diode connected between the junction of said capacitor and winding and the collector of said second transistor.

9. A magnetic recording system as recited in claim 6 wherein said second transistor circuit includes a transistor having its collector-emitter path connected across said winding, and said means for applying pulses is connected to the bases of said transistors.

10. A magnetic recording system comprising a magnetic recording medium, a magnetic recording head for recording on said medium and having a winding, an energizing circuit for said winding including a first transistor circuit, and a capacitor coupling said transistor circuit to said winding and forming an oscillator circuit therewith, a damping circuit including a second transistor circuit connected across said winding, and means for applying pulses to said transistor successively to control their conductive states and the energization waveshape for said winding, said magnetic medium being a magnetic drum.

References Cited in the file of this patent

UNITED STATES PATENTS 2,946,899 Day ------------------- July 26, 1960